(12) United States Patent
Bortone et al.

(10) Patent No.: US 7,820,215 B2
(45) Date of Patent: Oct. 26, 2010

(54) APPARATUS AND METHOD FOR PRODUCING COLORED EXTRUDED FOOD PRODUCTS

(75) Inventors: Eugenio Bortone, Frisco, TX (US); Perry Hanson, Dallas, TX (US); Devang Jitendra Sutaria, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 342 days.

(21) Appl. No.: 11/925,325

(22) Filed: Oct. 26, 2007

(65) Prior Publication Data

US 2008/0044527 A1 Feb. 21, 2008

Related U.S. Application Data

(62) Division of application No. 10/414,848, filed on Apr. 16, 2003, now Pat. No. 7,320,583.

(51) Int. Cl.
*A23P 1/12* (2006.01)

(52) U.S. Cl. .......................... 426/231; 426/516; 426/519

(58) Field of Classification Search .................. 426/231, 426/233, 448, 449, 621, 498, 504, 508, 509, 426/516, 519
See application file for complete search history.

(56) References Cited

U.S. PATENT DOCUMENTS

| | | | | |
|---|---|---|---|---|
| 3,001,770 | A | * | 9/1961 | Mueller .................... 366/160.4 |
| 3,165,299 | A | * | 1/1965 | Balamuth et al. ............ 366/118 |
| 3,272,388 | A | * | 9/1966 | Whitmore ................. 222/129.1 |
| 3,326,530 | A | * | 6/1967 | Schlernitzauer ............. 366/144 |
| 3,599,292 | A | | 8/1971 | Ronzoni |
| 4,155,655 | A | | 5/1979 | Chiselko |
| 4,684,488 | A | | 8/1987 | Rudolph |
| 4,793,520 | A | * | 12/1988 | Gerber ..................... 222/145.2 |
| 4,848,915 | A | | 7/1989 | Fintel |

(Continued)

OTHER PUBLICATIONS

"Focus on Liquid Flow Measurement" first published Dec. 7, 2000, retrieved from the Internet Apr. 11, 2005, URL http://www.cheresources.com/flowmeas.shtml (6 pages).

(Continued)

*Primary Examiner*—Drew E Becker
(74) *Attorney, Agent, or Firm*—Colin P. Cahoon; Celina M. Diaz; Carstens & Cahoon, LLP

(57) ABSTRACT

An apparatus and associated method for varying the color and/or flavor of an extruded food product during a single production run of a single extrusion device. The apparatus includes a multi-additive injection system, which is attached to a fluid supply line of an extrusion device. The injection system is comprised of a plurality of additive supply tanks, which are each in fluid communication with the fluid supply line via an injection manifold, and a metering mechanism which selectively controls the amount of additive injected into the supply line by each individual supply tank. The injection system may also include a central control mechanism for calibrating the amount of additive injected into the supply line and for maintaining a constant fluid volume added to the extrusion device. Each of the additive supply tanks may contain a different colorant and/or flavoring. Two variants of the injection manifold are provided as well as a novel injection sequence for use with the disclosed system.

9 Claims, 7 Drawing Sheets

U.S. PATENT DOCUMENTS

| | | | |
|---|---|---|---|
| 4,874,619 A | | 10/1989 | Leonardo et al. |
| 5,114,724 A | | 5/1992 | Bottero |
| 5,158,725 A | | 10/1992 | Handa |
| 5,165,949 A | | 11/1992 | Farnsworth et al. |
| 5,232,644 A | | 8/1993 | Hammond et al. |
| 5,331,364 A | * | 7/1994 | Borden ................. 396/632 |
| 5,405,917 A | | 4/1995 | Mueller, Jr. et al. |
| 5,486,049 A | | 1/1996 | Boatman et al. |
| 5,538,748 A | | 7/1996 | Boatman et al. |
| 5,626,892 A | | 5/1997 | Kehoe et al. |
| 5,700,494 A | * | 12/1997 | Masse et al. ............. 425/131.1 |
| 5,723,517 A | * | 3/1998 | Campo et al. ............... 523/303 |
| 5,758,571 A | * | 6/1998 | Kateman et al. ............. 99/455 |
| 5,776,534 A | | 7/1998 | Christensen |
| 5,852,113 A | | 12/1998 | Guntherberg |
| 5,919,509 A | | 7/1999 | Cremers et al. |
| 5,955,116 A | | 9/1999 | Kehoe et al. |
| 5,962,035 A | * | 10/1999 | Masse et al. ............. 425/131.1 |
| 5,993,054 A | | 11/1999 | Tan et al. |
| 6,001,402 A | | 12/1999 | Dupont |
| 6,004,025 A | | 12/1999 | Kubiak |
| 6,145,433 A | | 11/2000 | Dupont |
| 6,285,453 B1 | | 9/2001 | Smith |
| 6,309,686 B1 | | 10/2001 | Zietlow et al. |
| 6,350,483 B1 | | 2/2002 | Ahad et al. |
| 6,358,547 B1 | | 3/2002 | Dupont |
| 6,509,049 B1 | * | 1/2003 | Parsons et al. .............. 426/250 |
| 6,863,513 B2 | | 3/2005 | Boudreau |
| 7,320,583 B2 | * | 1/2008 | Bortone et al. ............. 425/155 |
| 2004/0262813 A1 | | 12/2004 | Pierick |
| 2005/0087906 A1 | | 4/2005 | Caretta |
| 2006/0003065 A1 | * | 1/2006 | Kateman ................... 426/506 |
| 2007/0010761 A1 | | 1/2007 | Mo |
| 2008/0060532 A1 | | 3/2008 | Bortone |

OTHER PUBLICATIONS

Kecol Pumps, "Industrial Pump Range," last updated Jan. 10, 2003, retrieved from the Internet Apr. 11, 2005, URL http://www.kecol.co.uk/pumps/industrial.htm (2 pages).

Mobley, R.K., pp. 117-119 from book entitled Fluid Power Dynamics, Elsevier pub. 2000, retrieved from the Internet at www.knovel.com (4 pages).

Valco Instruments Company, "About Acuators" copyright 2001, retrieved from the Internet Apr. 11, 2005, URL http://222.vici.com/act/act_intr.htm (4 pages).

* cited by examiner

APPARATUS AND METHOD FOR PRODUCING COLORED EXTRUDED FOOD PRODUCTS

CROSS-REFERENCE TO RELATED APPLICATIONS

This application is a divisional application of co-pending U.S. patent application Ser. No 10/414.848, filed on Apr. 16, 2003.

BACKGROUND OF THE INVENTION

1. Technical Field

The present invention relates to an apparatus and method for coloring extruded products. More particularly, the present invention relates to a novel method and apparatus for varying the coloring and/or flavoring of extruded food products during a single production run of a single extrusion device.

2. Description of the Related Art

The use of extrusion devices is prevalent in a number of industries, especially the food industry. Because of their versatility and efficiency, extrusion devices are often utilized to produce a wide variety of food products such as ready-to-eat (R-T-E) cereals, snack foods and confections. The use of extrusion devices is particularly extensive in manufacturing food products because a single machine can produce large quantities of finished product in a minimal amount of time.

Food manufacturing processes which utilize extrusion devices typically include an extruder device which receives a flowing mass of an edible base substance and conveys it via a screw pump mechanism to an outlet where the substance is forced through an extruder die. Upon exiting the extruder die, the extruded substance may be formed into sheets or cut to a desired dimension by a cutting mechanism. The extruded substance, or extrudate, may thereupon be further processed by, for example, freezing or cooking.

By way of example, in FIG. 1, there is shown a simplified schematic representation illustrating a prior art food manufacturing process utilizing an extrusion device. As is commonly known in the art, such a process typically includes an extrusion device 10, which includes an inlet 12 for receiving a flowing mass of an edible base substance; a main passageway 14, which directs the substance to a screw pump mechanism 18, which further conveys the substance through an extrusion chamber 16 in the direction of arrow ε to an outlet 20 where the substance is forced through an extruder die (not shown). The extrusion chamber 16 is enclosed in an extruder casing 22. The cross-sectional area of the extrusion chamber 16 is typically much greater than the cross-sectional area of the outlet 20 and the extruder die.

Upon exiting the extruder die, the extruded substance may be formed into sheets or cut to a desired dimension by a cutting mechanism (not shown). The extrusion device 10 may also include an additive supply line 24 which allows an additive to be introduced to the substance prior to its conveyance through the extrusion chamber 16 via the screw pump mechanism 18. While being conveyed through the extrusion chamber 16 via the screw pump mechanism 18, the additive is usually thoroughly admixed with the substance prior to reaching outlet 20. A pump mechanism 30 is used to control the flow rate of the additive in the direction of arrow w from a source 32 to a fluid supply inlet 26 in the extruder casing 22.

Extrusion devices may also impart or extract heat to or from the base substance during its transit through the extruder device. Typically, the casing 22 surrounding the extrusion chamber 16 is adapted to impart or extract heat to or from the substance in accordance with practices commonly known in the art. For example, chiller extruders may be used to chill and thicken a base substance to a desired consistency prior to its extrusion through the extruder dies. Similarly, cooker extruders are used to prepare cooked dough extrudates that may then be formed into individual cereal or snack pieces, and subsequently baked or fried. One variation of cooker extruders that is increasingly popular comprises an extruder wherein the conditions of the extruder and the cooked cereal dough are such that the dough puffs immediately upon being extruded and is cut into individual puffed pieces at the die head. Such a process is referred to generally as "direct expansion" or "puff extrusion."

Current advances in extruder technology also make it possible for a single extruder device to produce multiple extruded shapes during one production run. For example, instead of using a single extruder die, an extruder device may include a plurality of outlet passageways that divide the original stream into multiple sub-streams, which are each then extruded through a separate extruder die.

While the preparation of a snack food product comprised of multi-shaped, puffed or direct expanded extrudate is desirable, it may also be desirable to produce a mixture of such a product that has different colors, flavors, or similar additives. For example, a snack food blend that includes a mixture of differently shaped pieces may be desirable, with each shape having a distinctive color and/or flavor. The different colors can be used to associate a shape with a particular attribute, such as hot, very hot, savory, sweet, etc. The coloring/flavoring of extruded food products typically comprises either coloring and/or flavoring the base substance prior to its introduction to the extruder device or adding a colorant and/or flavoring to the base substance within the extruder device wherein it is admixed utilizing the screw pump mechanism.

In current practice, in order to produce a snack food blend of distinctive colors, shapes or flavors, a sequence of individual color/flavor/shape production runs are made. The product from each run is collected and subsequently admixed to form the aggregate blend. By way of illustration for a direct expanded snack food product, a first cooked cereal dough is prepared by adding a first color to the starting material or by injecting a first color into the dough upstream of the extrusion die. The first colored dough is directly expanded through a shaped extrusion die and face cut as it expands to form individual pieces. To prepare a second color and shape, the first color injection is discontinued and a second different color material is injected into the cooked cereal dough. To prepare a second shape, the first die head is removed and substituted with a die head having the desired second shape.

While satisfactory, one problem with this conventional practice resides in the generation of unusable scrap material during the color addition transition as the new color is admixed with the residual amounts of the prior color. Still more scrap material is generated as the extruder comes up to steady state conditions after the second color run is started. A second problem is that the various colored pieces must be collected in large batches to be admixed at a later time to form the blended snack food product. The properties (e.g., plasticity, temperature, moisture content, starch conditions, frangibility, etc.) of the finished pieces may deteriorate over the storage period. A third problem relates to the broken pieces, dust and/or cereal fines created by the admixing step.

A variety of proposals have previously been made to remedy the aforementioned problems associated with extrusion devices in producing extruded food products having a blend of distinctive shapes, colors, and/or flavors.

For example, U.S. Pat. No. 5,169,949 to Farnsworth et al. discloses a free-standing die assembly for use in the production of extruded products. The Farnsworth et al. '949 apparatus is mounted as a separate unit apart from the extruder in which product ingredients are processed. In accordance with the Farnsworth et al. '949 invention, hot flowable dough processed in an extruder is carried via suitable tubing to the center plate from where it is distributed to the planar faces of the plate and into the die units, from which it is extruded through the die orifices in the die units. The die assembly may be modified to permit the production of coextruded product from the die orifices in the die units of the assembly. One or more of the die assemblies may be associated with a single extruder. The Farnsworth et al. '949 process may also include injecting and mixing an additive into the conduits carrying the hot flowable dough to one or both of the die assemblies. However, while the Farnsworth et al. '949 patent discloses a means for adding multiple colors to a common extrudate (see e.g., FIG. 4), there are no provision for mixing or varying pre-mixed colorants. Moreover, the Farnsworth et al. '949 device is a fairly complex tubing and die assembly that is mounted as a separate unit apart from the extruder in which the base product ingredients are initially processed.

Other prior proposals include U.S. Pat. No. 5,919,509 to Cremers et al., which discloses an apparatus and method for forming a single extrudable food stream such as a cooked cereal dough into a plurality of differently colored and/or flavored dough streams. The initial plastic food mass (i.e., base substance) is divided into a plurality of substreams by branching a main passageway section into a plurality of sub-divided dough passageways. These sub-passageways are each separately supplied an additive and has disposed therein a multiplicity of in-line static mixer elements to admix the additive into the substream of the plastic food mass prior to extrusion through a die port. While effective, the Cremers et al. '509 device is still rather complicated and offers no variance of coloration/flavoring of each separate substream.

Thus, a need exists for an improved apparatus and associated method for varying the coloring and/or flavoring of extruded food products during a single production run of a single extrusion device. Further, a need exists for an less complicated apparatus and associated method for producing an extruded food product having a blend of distinctive shapes, colors, and/or flavors during a single production run of a single extrusion device.

SUMMARY OF THE INVENTION

The apparatus and associated method of the present invention overcomes many of the disadvantages of prior art extrusion devices enabling a single extrusion device to produce a multi-colored and/or multi-flavored extruded food product during a single production run. The improved system includes a multi-additive injection system, which is attached to a fluid supply line of an extrusion device. The injection system is comprised of a plurality of additive supply tanks, which are each in fluid communication with the fluid supply line via an injection manifold, and a metering mechanism which selectively controls the amount of additive injected into the supply line by each individual supply tank. Each of the additive supply tanks may contain a different colorant and/or flavoring. Correspondingly, each of the different colorants and flavorings may have a different density. Additionally, the different colorants and flavorings may be comprised of an oil based media or emulsified compounds The injection manifold is comprised of a tubular body having a passageway defined therethrough and adapted to be coaxially aligned with and fixably attached to the fluid supply line so as to act as a passageway for a fluid passing through the fluid supply line. The injection manifold also includes a plurality of injection ports, which are formed in the body, and are each in fluid communication with one of the plurality of supply tanks via an associated additive supply line. In addition, each injection port may include an accessory fitting to allow additive supply lines to be quickly attached and detached. Two variants of the injection manifold are disclosed: one with a series configuration of injection ports, and one with a radial or parallel configuration of injection ports.

The injection system may also include a central control mechanism for calibrating and sequencing the amount of additive injected into the supply line, and for maintaining a constant fluid volume added to the extrusion device. The control mechanism may be a mechanical or electromechanical device that is connected to the metering mechanism and the pump mechanism, and may also include remotely placed flow sensors. In a preferred embodiment, the control mechanism may comprise a computerized device.

In accordance with one feature of the invention, a plurality of colorants and/or flavorings may each be individually injected into the fluid stream of the supply line in a sequence that results in an extruded food product of multiple colors and flavors of the same shape.

In accordance with another feature of the invention, two differently hued colorants may be injected into the fluid stream of the supply line so as to combine to form a third hued colorant that is subsequently admixed into an extruded food product. Likewise, a colorant and a flavoring may be in injected into the fluid stream of the supply line so as to combine to form a flavored colorant that is subsequently admixed into an food mass which results in an extruded food product.

A novel feature of the invention is a repeatable color injection sequence for use with the disclosed system wherein a continuous flow of multi-colored extrudate may be maintained with a minimum production of waste material, and which results in the production of certain acceptable hues while precluding the production of other less desirable hues,

BRIEF DESCRIPTION OF THE DRAWINGS

A more complete understanding of the method and apparatus of the present invention may be had by reference to the following detailed description when taken in conjunction with the accompanying drawings, wherein.

Figure 1:
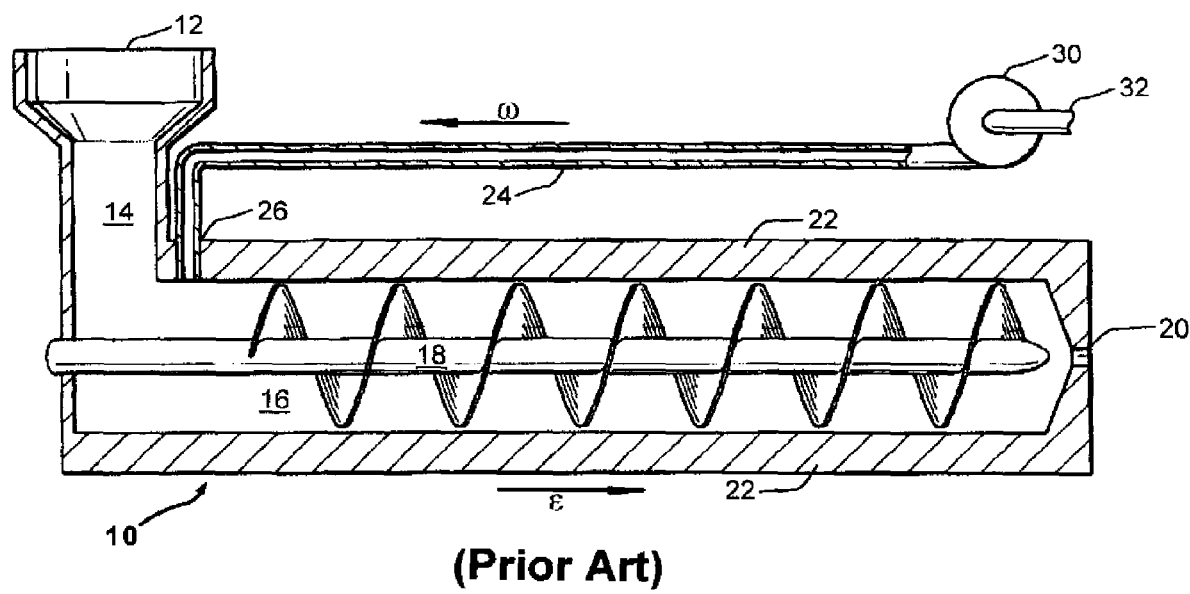
FIG. 1 is a simplified schematic representation, not to scale, illustrating a prior art food manufacturing process utilizing an extrusion device.

Where used in the various figures of the drawing, the same numerals designate the same or similar parts. All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
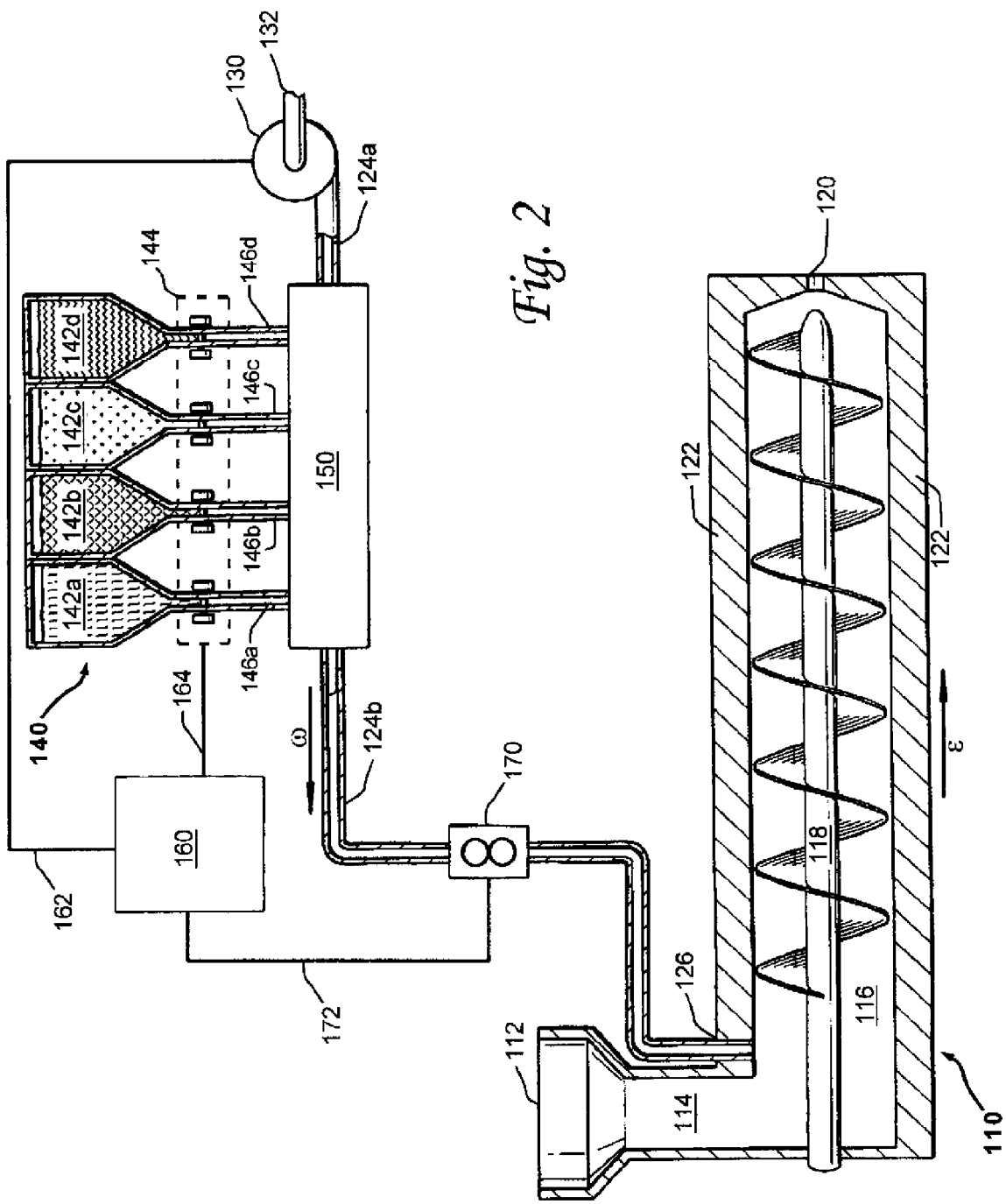
FIG. 2 is a schematic representation, not to scale, illustrating an embodiment of a food manufacturing process utilizing an extrusion device and the multi-additive injection system of the present invention.

Referring now to the drawings and in particular to FIG. 2, there is shown an embodiment of the present invention illustrating a process and means for varying the color and/or flavor of extruded food products during a single production run of a single extrusion device. To more fully illustrate the general principals disclosed in the following paragraphs, the process shown in FIG. 2 may, for example, illustrate a direct expansion or puff extrusion process for manufacturing a corn-based puffed product. In accordance with such a process, a plastic food mass, such as corn meal, is directed in a conventional manner to the inlet 112 of an extrusion device 110, wherein it is further directed via passageway 114 to a screw pump mechanism 118. By way of example, the extrusion device 110 may be a single (e.g., American Extrusion, Wenger, Maddox) or twin (e.g., Wenger, Clextral, Buhler) screw-type cooker extruder such as a model X-25 manufactured by Wenger or BC45 manufactured by Clextral of the United States and France, respectively. A fluid (e.g., water) may be added to the corn meal food mass via a fluid supply line 124*a-b* and a fluid supply inlet 126 in the extruder casing 122. Supply line 124*a-b* is in fluid communication with a source 132 of the fluid via a pump mechanism 130. The pump mechanism 130 may be used to control the flow rate of the fluid in the direction of arrow w from the source 132 to a fluid supply inlet 126 in the casing 122 of the extrusion device 110. In the example, the water is admixed with the corn meal while in the extrusion chamber 116 to bring the overall moisture content of the corn meal food mass up to 15% to 18%. The corn meal becomes a viscous melt as it approaches the outlet 120 where the corn meal food mass is forced through an extruder die (not shown).

While transiting through the outlet 120, the viscous melt of the food mass is subjected to high pressure and temperature, such that the viscous melt exhibits a plastic melt phenomenon wherein the fluidity of the melt increases as it flows through the outlet 120. As the corn meal food mass extrudate exits the outlet and extruder die, it rapidly expands, cools, and very quickly goes from the plastic melt stage to a glass transition stage, becoming a relatively rigid structure, referred to as a "rod" shape if cylindrical, puffed extrudate. This rigid rod structure can then be cut into small pieces, further processed (e.g., baked or fried, and seasoned) as required.

The diameter of the outlet 120 and associated extruder die typically ranges between 2.0 mm and 12.0 mm for a corn meal formulation at conventional moisture content, throughput rate, and desired extrudate rod diameter or shape. However, the diameter of outlet 120 and associated extruder die might be substantially smaller or larger for other types of extrudate materials.

As shown in FIG. 2, the means for varying the coloring/flavoring of the extruded food product comprises a multi-additive injection system 140 attached to the fluid supply line 124*a-b* and positioned prior to the fluid supply inlet 126 in the casing 122 of the extrusion device 110. The injection system 140 includes a plurality of additive supply tanks (e.g., 142*a-d*) which are each in fluid communication with the fluid supply line 124*a-b* via an injection manifold 150. Each of the plurality of additive supply tanks (e.g., 142-*a-d*) may contain a different colorant and/or flavoring. The injection system 140 also includes a metering device 144, which selectively controls the amount of additive injected into the supply line 124*a-b* by each individual supply tank. The metering device 144 may be comprised of individual metering mechanisms attached each additive supply line (e.g., 146*a-d*). For example, as illustrated in FIGS. 4*a-d*, the individual metering mechanisms (e.g., 144*a-d*) may comprise either manually or electrically actuated valve mechanisms. In a preferred embodiment, the individual metering mechanisms (e.g., 144*a-d*) may each comprise a peristaltic pump having an integral check valve.

It should be understood that the injection process whereby the colorant and/or flavoring is caused to flow from its supply tank into the stream of fluid flowing though the passageway 152*a*, may be gravitationally produced or pressure induced. As is known in the art, a positive pressure exerted on the colorant and/or flavoring or a negative (i.e., vacuum) force created by the flowing fluid in the passageway 152*a* will induce a colorant and/or flavoring to flow from its supply tank into the fluid stream flowing in the passageway 152*a* when the associated metering mechanism is opened. In a preferred embodiment, a positive displacement pump (e.g., peristaltic pump) positioned on the flexible additive supply line provides a positive pressure thereby inducing the colorant and/or flavoring to flow from its supply tank into the stream of fluid flowing in the passageway 152*a* when the associated metering mechanism is opened.

It should be further understood that the supply line 124*b* downstream of the injection manifold 150 may include in-line static mixer elements, commonly known in the art, to aid in dispersing and mixing the various colorants/flavorings into the flowing stream of fluid. Alternatively, the length of supply line 124*b* may be minimized so as to essentially connect the injection manifold 150 directly to the fluid supply inlet 126 in the casing 122 of the extrusion device 110 such that any mixing and dispersing of the various colorants and flavorings is accomplished primarily by the screw pump mechanism 118.

The process of the present invention may be further improved with the aid of a central control mechanism 160 connected to the metering device 144 and the pump mechanism 130. Such a control mechanism may be used to control the sequencing of colorants/flavorings, the time between injecting the various colorants/flavorings, and the amount of colorant/flavoring injected. The control mechanism may also be used to control the flow rate of the pump mechanism 130 to ensure a constant volume of fluid is provided to the fluid supply inlet 126 via supply line 124*a-b*. For example, a flow sensor device 170 may be placed downstream of the injection manifold 150 to detect the amount of colorant and/or flavoring injected into supply line 124*a-b*. Upon sensing the injected amount, the sensor device 170 sends a signal to the central control mechanism 130 which may, in turn, send a signal to the pump mechanism 130 to increase or decrease the stroke of the pump mechanism 130 in order to compensate for any volume changes incurred due to the injection of a particular colorant or flavoring. Thus, the multi-additive injection system 140 may be synchronized independently from the pump mechanism 130 so as to maintain a constant total volume of fluid supplied to the extrusion device via the fluid supply inlet 126.

In perhaps its simplest embodiment, the central control mechanism 160 may comprise a centralized mechanical or electromechanical switchboard that may be manually operated. However, in a preferred embodiment, the control mechanism 160 may comprise a computerized control mechanism such as a programmable logic controller (PLC) which includes a programmable memory for storing instructions to implement specific functions such as logic, injection sequence, timing, counting and arithmetic to automatically control the multi-additive injection system 140 and the pump mechanism 130.

Referring now, once again, to FIG. 2, the injection manifold 150 comprises a tubular body having a passageway defined therethrough and adapted to be coaxially aligned with and fixably attached to the supply line 124a-b so as to act as a passageway for a fluid passing through the supply line 124a-b. The injection manifold 150 also includes a plurality of injection ports, which are formed in the body and generally perpendicular to the longitudinal axis of the passageway. Each injection port provides fluid communication between the passageway and the exterior of the body of the injection manifold 150. Each injection port is, in turn, in fluid communication with one of the plurality of supply tanks (e.g., 142a-d) via an associated additive supply line (e.g., 146a-d). Each injection port may be equipped with an accessory fitting, which allows additive supply lines (e.g., 146a-d) to be quickly attached and detached.

Figure 3:
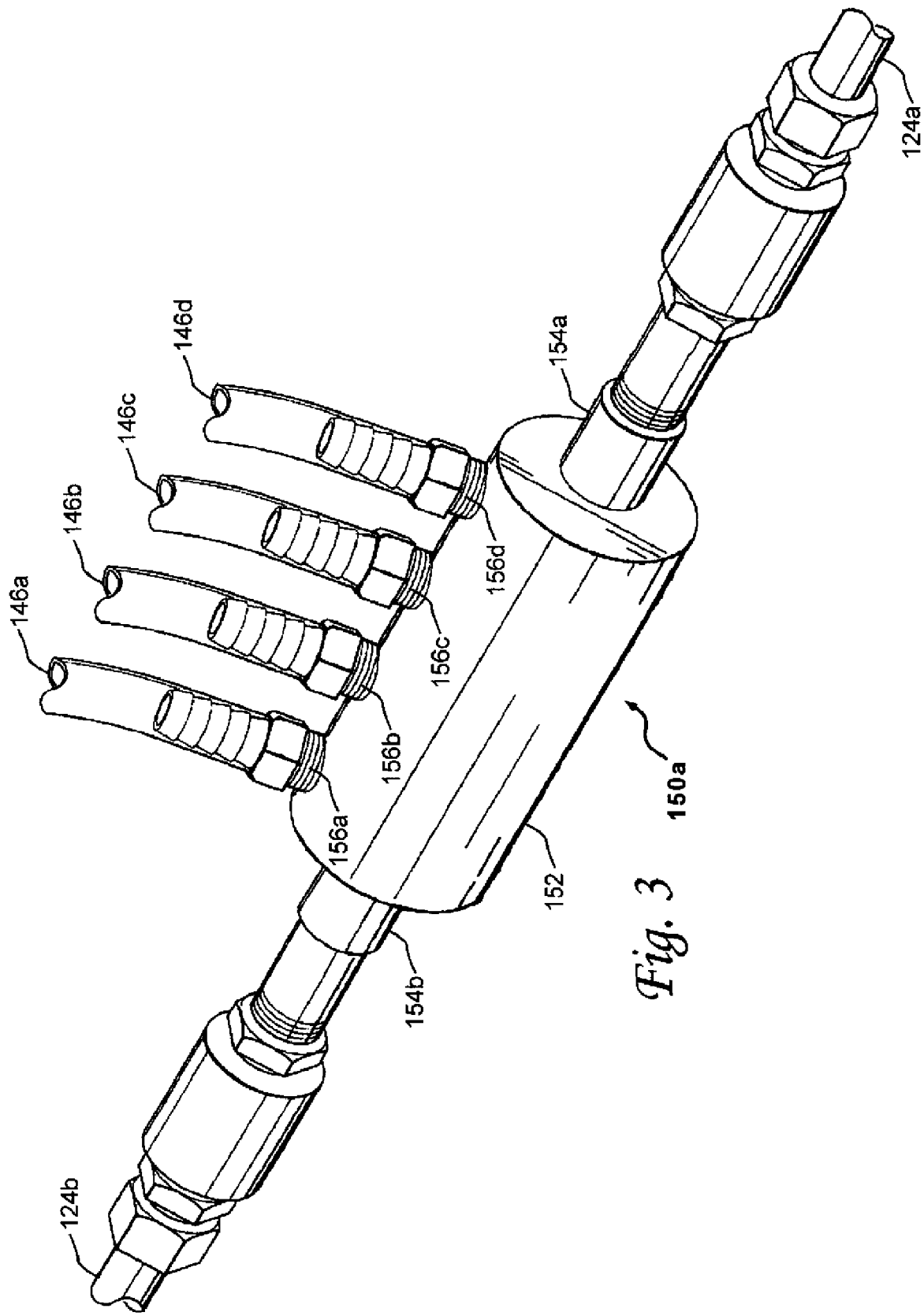
FIG. 3 is a perspective drawing of a variant of an injection manifold within the multi-additive injection system of the present invention, illustrating a series arrangement of injection ports on the injection manifold.

For example, as shown in FIG. 3, in one embodiment, the injection manifold 150a comprises a generally tubular body 152 having a passageway formed therethrough which connects an inlet port 154a in fluid communication with an outlet port 154b so as to act as a fluid passageway for a fluid passing through the supply line 124a-b. The inlet port 154a is adapted to be fixably attached the supply line 124a and the outlet port 154b is adapted to be fixably attached the supply line 124b. The manifold 150a also includes a plurality of injection ports and their associated accessory fittings (e.g., 156a-d) arranged along the longitudinal axis of the tubular body 152 in a series configuration. The accessory fittings (e.g., 156a-d) are each, in turn, connected to an associated additive supply lines (e.g., 146a-d).

Returning now to the example process for manufacturing a corn-based puffed product, when the entire metering device 144 is in the closed position, the fluid (e.g., water) is supplied to the fluid supply inlet 126 in much the same way as before. However, when one of the individual metering mechanisms (e.g., 144a-d) is actuated into an opened position, a colorant or flavoring may be added and dispersed into the fluid stream prior to reaching the inlet 126 where it is subsequently admixed with the viscous melt of the corn meal food mass by the screw pump mechanism 118. This process is not in and of itself novel, as it is known in the art to inject a single colorant or flavoring into an additive supply line. The novelty of the present invention lies in its ability to vary the specific colorant or flavoring added to the supply line during a single production run. This is accomplished by sequencing the opening and closing of the various metering mechanisms (e.g., 144a-d) so as to inject a variety of distinct colorants/flavorings into the fluid to thereby provide an unlimited variety of colored and flavored extruded food products during a single production run of a single extrusion device.

By way of example, with reference now to FIGS. 4a-d, schematic representations, not to scale, are shown which illustrate an injection sequence of the multi-additive injection system 140 of the present invention utilizing the variant of the injection manifold 150a shown in FIG. 3. As stated previously, the multi-additive injection system 140 is comprised of a plurality of supply tanks (e.g., 142a-d), with their associated metering mechanisms (e.g., 144a-d) and additive supply lines (e.g., 146a-d), connected to the injection manifold 150a. The injection manifold 150a comprises a tubular body 152 having a passageway 152a formed therethrough which is coaxially aligned with and fixably attached to the supply line 124a-b so as to act as a passageway for a fluid passing through the supply line 124a-b. Supply line 124a is in fluid communication with a source of a fluid (in this case water) which flows in the direction of arrow w. Supply line 124b is in fluid communication with the fluid supply inlet 126 in the casing 122 of the extrusion device 110.

Figure 4A:
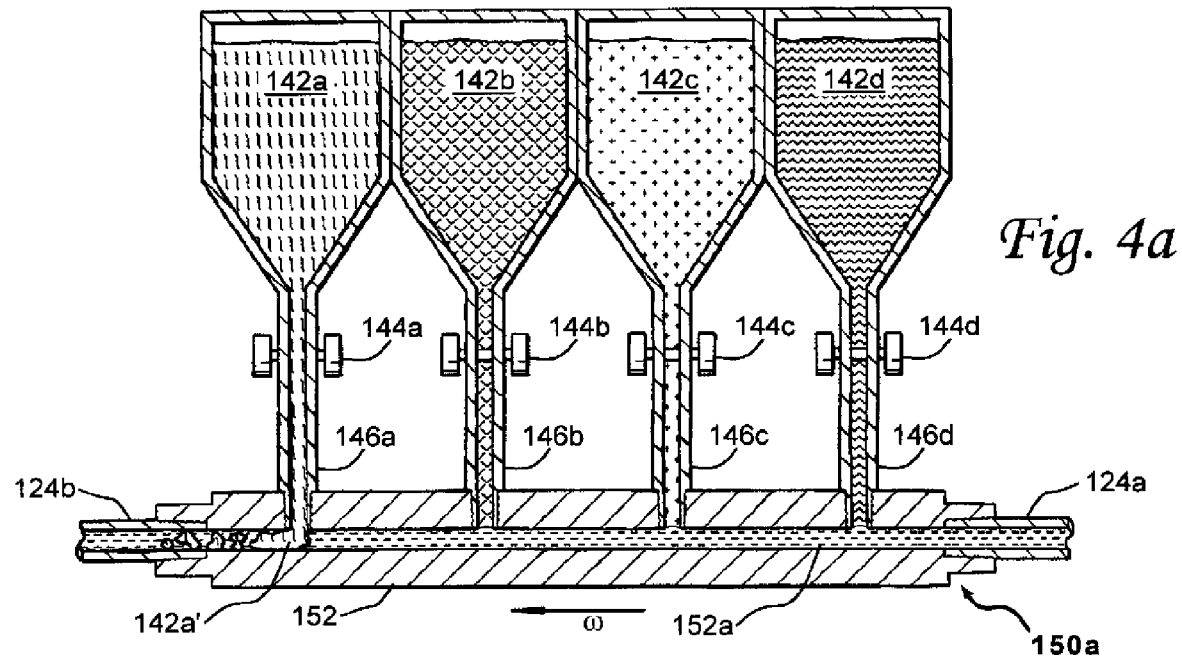
FIGS. 4*a*-4*d* are schematic representations, not to scale, of the multi-additive injection system of the present invention utilizing the injection manifold shown in FIG. 3, illustrating an additive injection sequence.
Figure 4B:
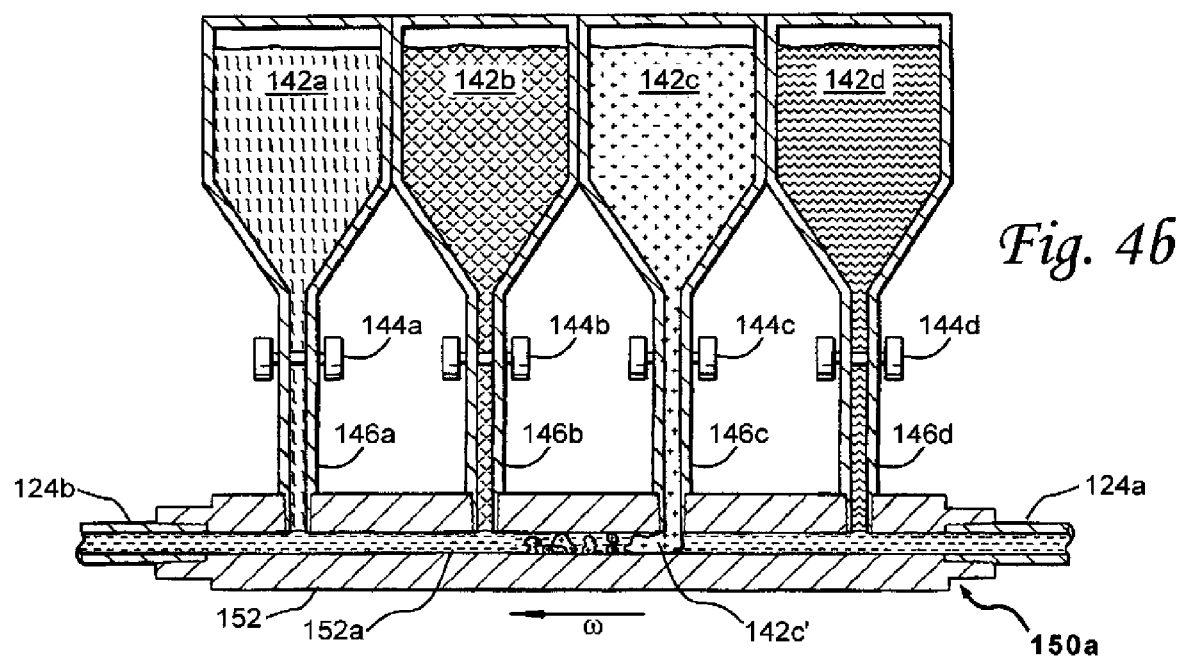
Figure 4C:
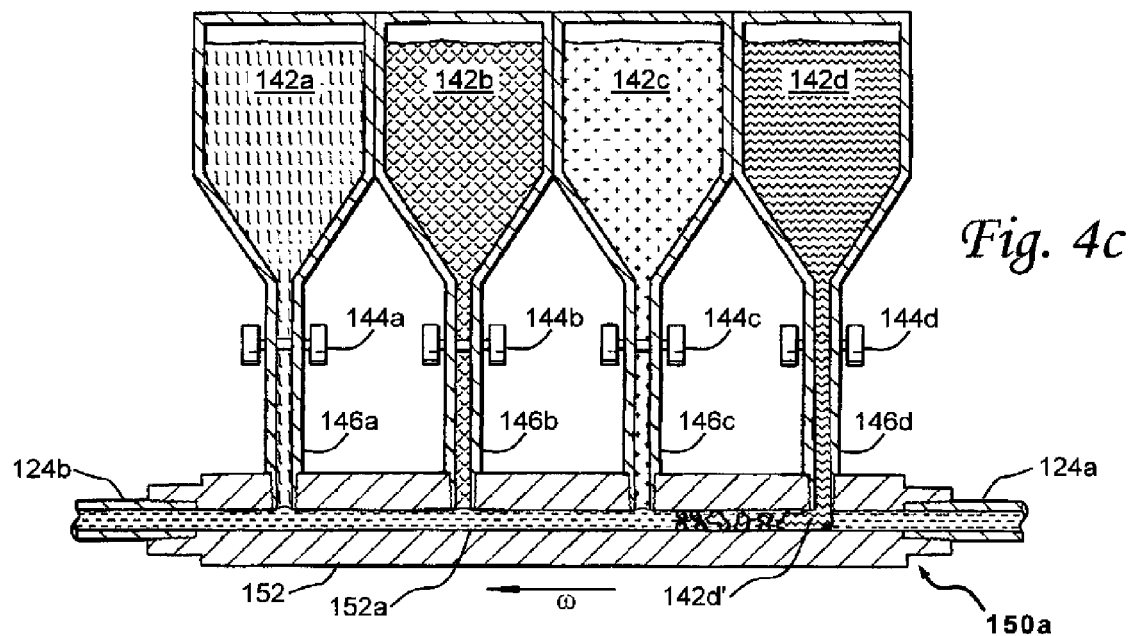

In the additive injection sequence which begins in FIG. 4a, a first metering mechanism 144a is opened allowing a quantity of a first colorant/flavoring 142a' to flow and disperse into the fluid stream flowing through the passageway 152a in the direction of arrow w. Referring now to FIG. 4b, to vary the coloring and/or flavoring, after a period of time has elapsed, the first metering mechanism 144a is closed and a second metering mechanism 144c is opened allowing a quantity of a second colorant/flavoring 142c' to flow and disperse the fluid stream flowing through the passageway 152a in the direction of arrow w. Likewise, as shown in FIG. 4c, after another period of time has elapsed, the second metering mechanism 144c is closed and a third metering mechanism 144d is opened allowing a quantity of a third colorant/flavoring 142d' to flow and disperse into the fluid stream flowing through the passageway 152a in the direction of arrow w. Between the closing of one metering mechanism and the subsequent opening another metering mechanism, the process typically includes a time gap to allow the preceding colorant/flavoring to be flushed past the injection point of the subsequent colorant/flavoring thereby precluding any unintended mixing.

On the other hand, in certain circumstances the mixing of two or more colorants and/or flavorings might be preferred. For example, it might be preferable to mix two colorants to form a third colorant. Likewise, it might also be desirable to mix a colorant with a flavoring to associate the flavoring with a specific color. For example, it might be desirable to mix a red hued colorant with a spicy flavoring. Conversely, it might be preferable to mix two insoluble colorants to create a marbleized effect in the resulting extruded product. As an example, if the resulting extruded product is puffed and cut to form balls with multiple colors, they may be viewed as marbles that adds play value to the extruded food product. Similarly, in some instances it may be preferable to inject additives comprised of insoluble granules, oil based media or emulsified compounds for flavoring or presentation value.

Figure 4D:
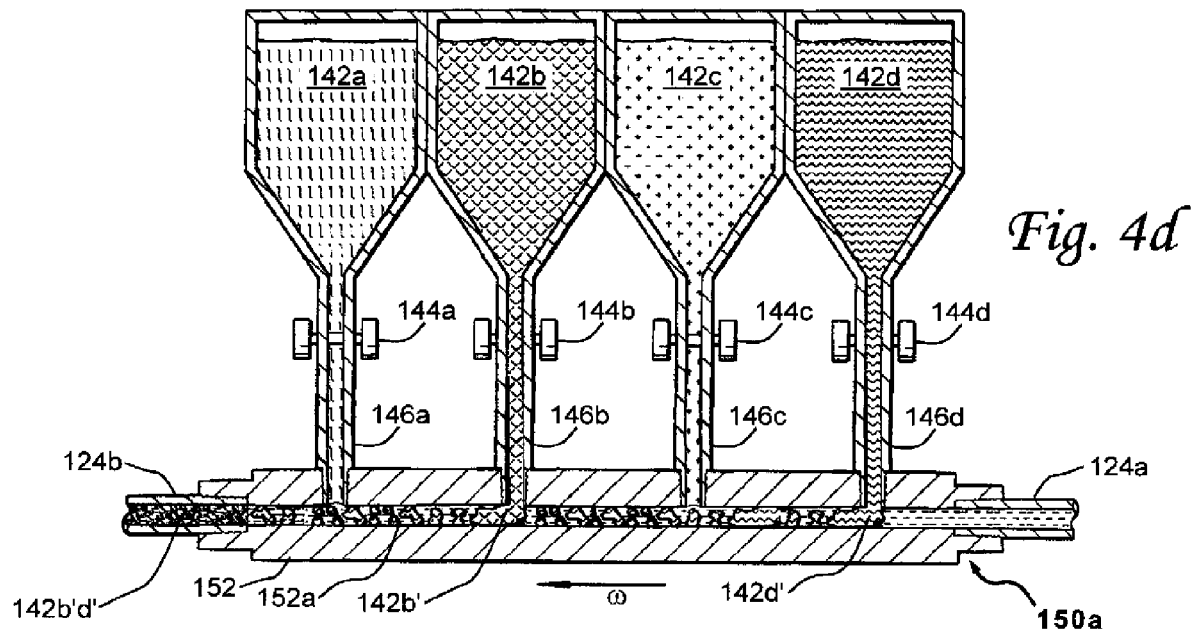

In whichever case, the desired injection and mixing may be accomplished with the multi-additive injection system 140 of the present invention. For example, as shown in FIG. 4d, the injection sequence comprises opening a first metering mechanism 144d allowing a quantity of a first colorant/flavoring 142d' to flow and disperse into the stream of fluid flowing through the passageway 152a in the direction of arrow w. Subsequently, a second metering mechanism 144b is opened allowing a quantity of a second colorant/flavoring 142b' to also flow and disperse into the stream of flowing fluid, thereby combining with the first colorant/flavoring 142d' to form a combined colorant/flavoring mixture 142b'd' which proceeds to the fluid supply inlet 126 via supply line 124b.

Figure 5A:
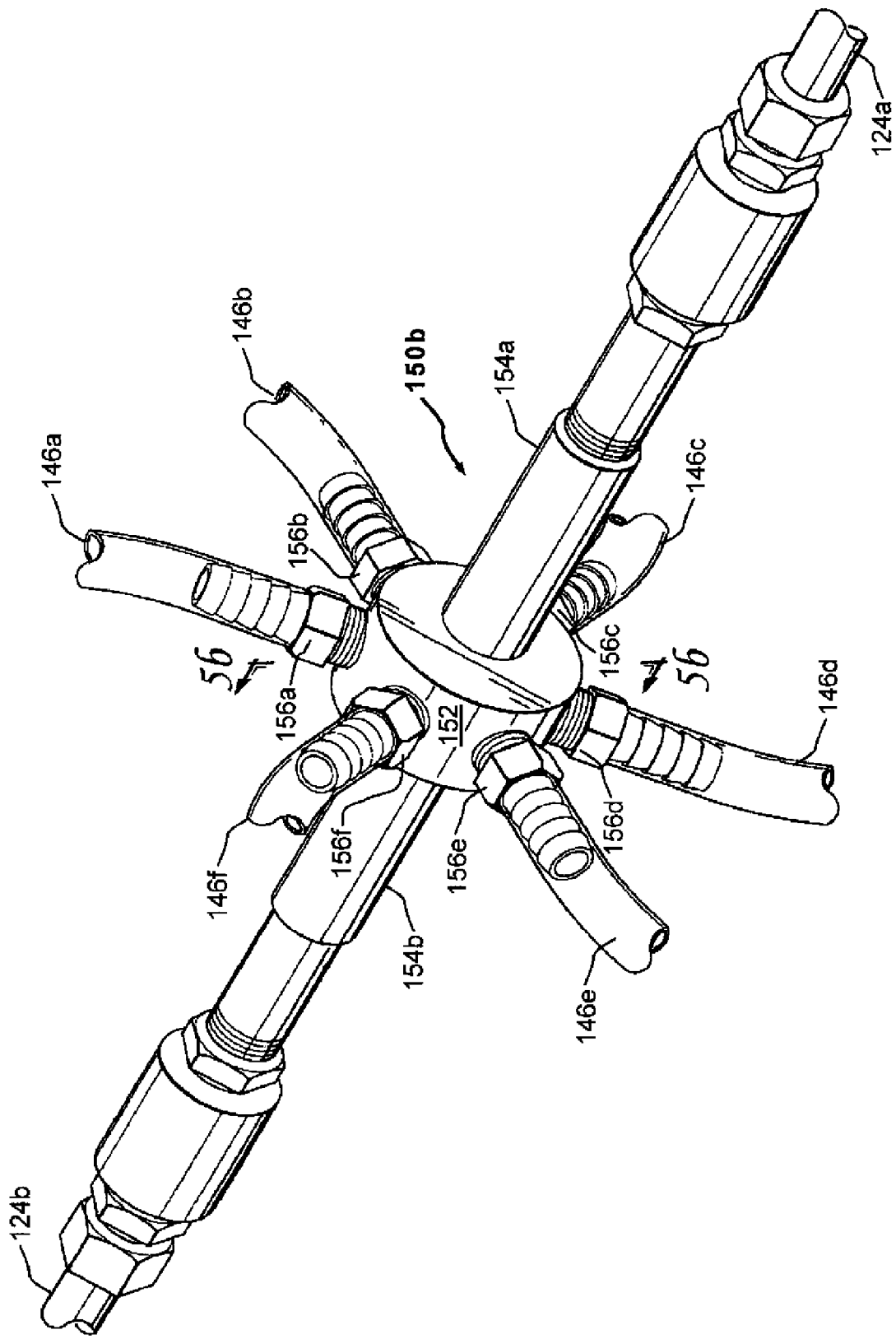
FIG. 5*a* is a perspective drawing of another variant of the injection manifold within the multi-additive injection system of the present invention; illustrating a parallel arrangement of injection ports on the injection manifold.
Figure 5B:
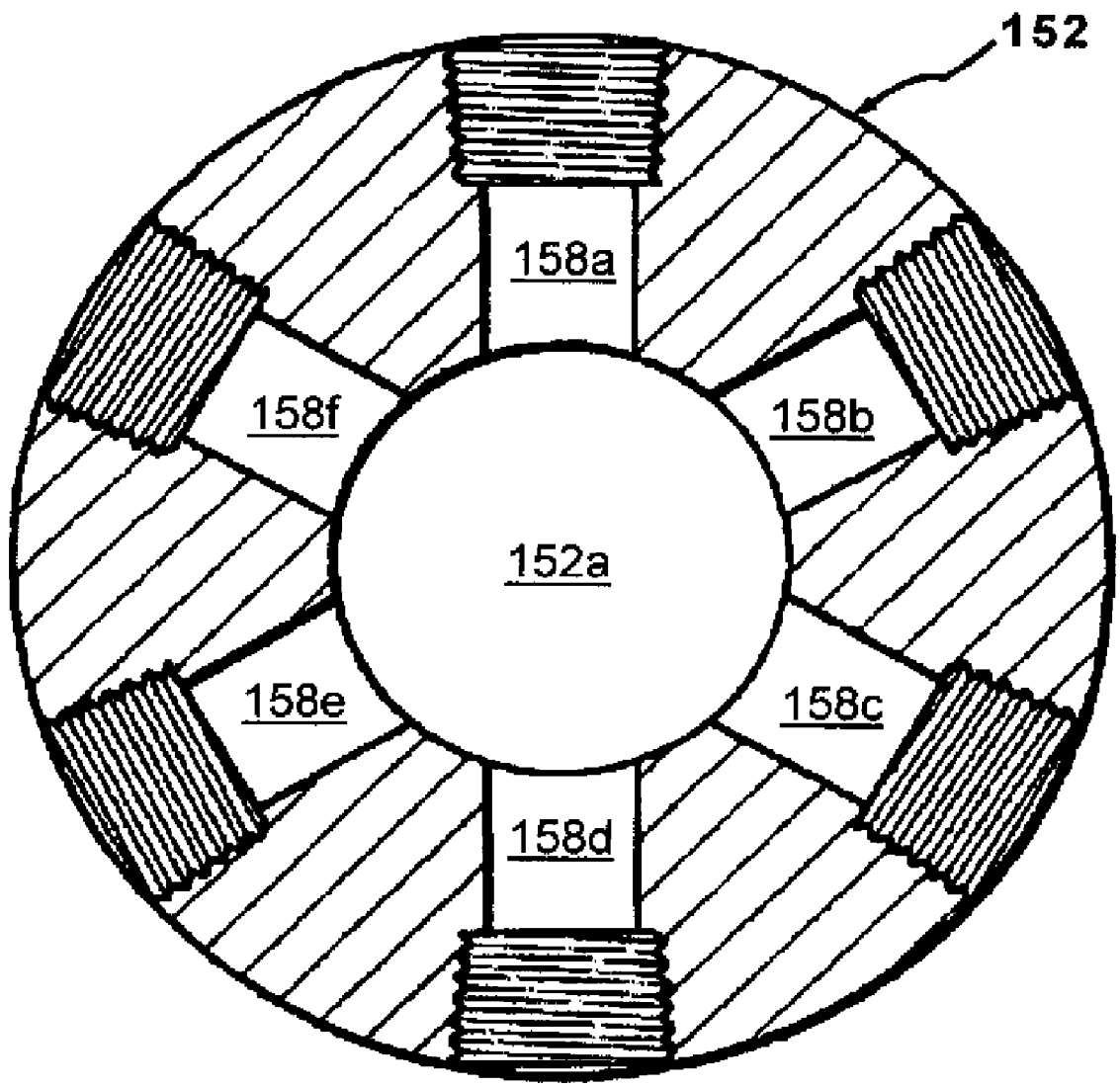
FIG. 5*b* is a cross-sectional view of the injection manifold, along line 5*b*-5*b* of FIG. 5*a*.

Referring now to FIGS. 5a-b, an additional and preferred embodiment of the injection manifold 150b of the multi-additive injection system 140 of the present invention is shown. As with the previous valiant, the preferred injection manifold 150*a* also comprises a generally tubular body 152 having a passageway formed therethrough which connects an inlet port 154*a* in fluid communication with an outlet port 154*b* so as to act as a passageway for any fluid passing through the supply line 124*a-b*. The inlet port 154*a* is adapted to be fixably attached the supply line 124*a* and the outlet port 154*b* is adapted to be fixably attached the supply line 124*b*. The manifold 150*b* also includes a plurality of injection ports (e.g., 156*a-f*) and their associated accessory fittings (e.g., 156*a-f*). As before, the accessory fittings (e.g., 156*a-f*) are each connected to an associated additive supply lines (e.g., 146*a-f*). However, instead of being arranged in a series configuration as in the previous variant, the plurality of injection ports (e.g., 156*a-f*) of the preferred injection manifold 150*b* are arranged in a radial or parallel configuration. While the embodiment shown in FIG. 5*a* illustrates the manifold 150*b* with six injection ports, it is understood that similarly configured manifolds may have a greater or lesser number of injection ports in accordance with design considerations.

While the previously outlined injection sequences are applicable to the preferred variant of the injection manifold 150*b*, the configuration of injection manifold 150*b* offers several distinct advantages. In addition to taking up less space than series configured manifolds with equivalent numbers of injection ports, by reducing the internal volume of the manifold, the preferred embodiment of the injection manifold 150*b* correspondingly reduces the time gap required to flush the system between color/flavor changes to prevent unintended mixing. Thus, color/flavor changes may be made more rapidly and accurately.

The use of the present invention to produce a variety of colored extruded food product during a single production run of a single extrusion device has, in some instances, correspondingly resulted in the necessity to create a repeatable sequence of primary colors so as to preclude the production of certain unwanted colors. For example, while certain hues (e.g., reds, yellows, oranges, purples, blues and greens) are acceptable colors for certain extruded food products, other hues (e.g., browns and blacks) are less desirable. While the system of the present invention provides for a flushing of one colorant from the system prior to the introduction of a different colorant, in practice nonetheless, precluding extended periods of flushing, it is almost inevitable that some mixing of colorants will occur in the extrusion device 110. It is, therefore, more efficient to create a repeatable sequence wherein colorants may be phased in and out without a flushing process to vary the coloration of the extruded food product without producing the less desirable hues.

Through experimentation and analysis, a repeatable coloring sequence process has been developed for use in conjunction with the apparatus and method of the present invention which results in the production of certain acceptable hues (i.e., reds, yellows, oranges, purples, blues and greens) while precluding the production of other less desirable hues, namely browns and blacks. For example, the sequence may begin with a yellow hued colorant being injected into the fluid stream which ultimately results in a yellowed hued extrudate being produced. After a period of time, a red hued colorant may also be gradually phased in and mixed with the yellow hued colorant to produce varying shades of orange hued extrudate. The yellow hued colorant may then be gradually phased out to ultimately produce a red hued extrudate. Next, a blue hued colorant may then be gradually phased in and mixed with the red hued colorant to produce varying shades of purple or violet hued extrudate. The red hued colorant may then be gradually phased out to ultimately produce a blue hued extrudate. Finally, the yellow hued colorant may then be gradually phased in and mixed with the blue hued colorant to produce varying shades of a green hued extrudate. Whereupon, the blue hued colorant may then be gradually phased out to ultimately produce a yellow hued extrudate, at which point the sequence begins again. In such a manner, a continuous flow of multi-colored extrudate may be maintained with a minimum production of waste material.

It will now be evident to those skilled in the art that there has been described herein an improved system and associated method for producing an extruded food product having a blend of distinctive shapes, colors, and/or flavors during a single production run of a single extrusion device. Moreover, the present invention may be combined with other inventions and techniques, known in the art of extruded food processing, to produce an multi-colored/flavored extruded food product having multiple shapes and imprinted lines.

It is understood that while the extrusion device 110, preferably a cooker extruder, is the preferred equipment to provide the extrudable corn-based puffed product used in the examples, other conventional equipment and techniques can be employed. For example, a batch cooker or semi-continuous cooker for cooking the ingredients in bulk can be equipped with a dough forming and conveying extruder element. In other embodiments, e.g., a low moisture fruit paste or a pasta dough, a simple screw conveyor can be employed.

Moreover, while in the present description particular reference is made to using a cooked corn meal dough for the preparation of a corn-based puffed product, the skilled artisan will appreciate that the present apparatus and techniques can be employed with a wide variety of extrudable food products, especially such plastic foods as 1) cooked cereal doughs such as for RTE cereals, 2) low moisture fruit products, 3) uncooked cereal doughs such as for pasta, cookies, or breadstuffs, 4) potato doughs such as for fabricated potato snacks, 5) chewing gums, 6) cheeses and cheese products, or 7) yogurts.

Although the invention hereof has been described by way of a preferred embodiment, it will be evident that other adaptations and modifications can be employed without departing from the spirit and scope thereof. For example, some of the steps in the system procedure could be conducted electrically in addition to those conducted manually. Thus, the terms and expressions employed herein have been used as terms of description and not of limitation; and thus, there is no intent of excluding equivalents, but on the contrary it is intended to cover any and all equivalents that may be employed without departing from the spirit and scope of the invention.

The invention claimed is:

1. A method for adding a plurality of additive substances to an extruded food product, comprising:
　(a) affixing an additive injection system to a fluid supply line, which supplies a stream of fluid from a fluid source to a feed port in an extrusion device, which is admixed with a plastic food mass as the food mass is conveyed through said extrusion device, wherein said fluid source is upstream of said additive injection system, and wherein said fluid supply line comprises a pump for regulating the flow of fluid from said fluid source which is located downstream of said fluid source, wherein said additive injection system comprises
　　i) an injection manifold having a plurality of injection ports, each comprised of a conduit which connects one of a plurality of supply tanks in fluid communication with said fluid supply line, wherein each supply tank contains a distinct additive substance, and ii) a metering mechanism positioned on each conduit which selectively actuates to open or close the conduit; and iii) a flow sensor attached to said fluid supply line and positioned downstream of said manifold, which senses the flow of the resulting combined fluid and additive prior to entering the extruder device;

(b) selectively actuating a first metering mechanism to open a first conduit thereby dispensing a first additive substance into said fluid stream for a first period of time;

(c) after passage of said first period of time, selectively actuating said first metering mechanism to close said first conduit;

(d) selectively actuating a second metering mechanism to open a second conduit thereby dispensing a second additive substance into said fluid stream for a second period of time; and (e) after passage of said second period of time, selectively actuating said second metering mechanism to close said second conduit.

2. The method of claim 1, further comprising:

f) selectively actuating a third metering mechanism to open a third conduit thereby dispensing a third additive substance into said fluid stream for a third period of time; and (g) after passage of said third period of time, selectively actuating said third metering mechanism to close said third conduit.

3. The method of claim 1, further comprising:

h) selectively actuating a fourth metering mechanism to open a fourth conduit thereby dispensing a fourth additive substance into said fluid stream for a fourth period of time; and (i) after passage of said fourth period of time, selectively actuating said fourth metering mechanism to close said fourth conduit.

4. A method for adding a plurality of additive substances to an extruded food product, comprising:

(a) affixing an additive injection system to a fluid supply line, which supplies a stream of fluid from a fluid source to a feed port in an extrusion device, which is admixed with a plastic food mass as the food mass is conveyed through said extrusion device, wherein said fluid source is upstream of said additive injection system, and wherein said fluid supply line comprises a pump for regulating the flow of fluid from said fluid source which is located downstream of said fluid source, wherein said additive injection system comprises i) an injection manifold having a plurality of injection ports, each comprised of a conduit which connects one of a plurality of supply tanks in fluid communication with said fluid supply line, wherein each supply tank contains a distinct additive substance, and ii) a metering mechanism positioned on each conduit which selectively actuates to open or close the conduit; and iii) a flow sensor attached to said fluid supply line and positioned downstream of said manifold, which senses the flow of the resulting combined fluid and additive prior to entering the extruder device;

(b) injecting a plurality of additive substances into said stream of fluid by selectively actuating said metering mechanisms positioned on each conduit in accordance with a repeatable injection sequence, said sequence comprising i) actuating a first metering mechanism to open a first conduit thereby dispensing a first additive substance into said fluid stream for a first period of time, ii) prior to the passage of said first period of time, actuating a second metering mechanism to open a second conduit thereby dispensing a second additive substance into said fluid stream for a second period of time, iii) after passage of said first period of time, actuating said first metering mechanism to close said first conduit, and iv) after passage of said second period of time, actuating said second metering mechanism to close said second conduit.

5. The method of claim 4, wherein said repeatable injection sequence, further comprises:

v) prior to the passage of said second period of time, selectively actuating a third metering mechanism to open a third conduit thereby dispensing a third additive substance into said fluid stream for a third period of time, vi) prior to the passage of said third period of time, repeating said sequence, and vii) after passage of said third period of time, selectively actuating said third metering mechanism to close said third conduit.

6. The method of claim 5, wherein said first additive substance is a yellow hued colorant, said second additive substance is a red hued colorant, and said third additive substance is a blue hued colorant.

7. A method for adding a plurality of additive substances to an extruded food product, comprising:

(a) affixing an additive injection system to a fluid supply line, which supplies a stream of fluid from a fluid source to a feed port in an extrusion device, which is admixed with a plastic food mass as the food mass is conveyed through said extrusion device, wherein said fluid source is upstream of said additive injection system, and wherein said fluid supply line comprises a pump for regulating the flow of fluid from said fluid source which is located downstream of said fluid source, wherein said additive injection system comprises i) an injection manifold having a plurality of injection ports, each comprised of a conduit which connects one of a plurality of supply tanks in fluid communication with said fluid supply line, wherein each supply tank contains a distinct additive substance, and ii) a metering mechanism positioned on each conduit which selectively actuates to open or close the conduit; and iii) a flow sensor attached to said fluid supply line and positioned downstream of said manifold, which senses the flow of the resulting combined fluid and additive prior to entering the extruder device;

(b) selectively actuating a first and second metering mechanisms to open a first and second conduits thereby dispensing a first and second additive substances into said fluid stream for a first period of time;

(c) after passage of said first period of time, selectively actuating said first and second metering mechanisms to close said first and second conduits;

(d) selectively actuating a third and fourth metering mechanisms to open a third and fourth conduits thereby dispensing a third and fourth additive substances into said fluid stream for a second period of time; and (e) after passage of said second period of time, selectively actuating said third and fourth metering mechanisms to close said third and fourth conduits.

8. The method of claim 7, wherein said first and third additives are distinct colorants and said second and fourth additives are distinct flavorings.

9. A method for coloring an extruded food product, comprising:
   (a) affixing an additive injection system to a fluid supply line, which supplies a stream of fluid from a fluid source to a feed port in an extrusion device, which is admixed with a plastic food mass as the food mass is conveyed through said extrusion device, wherein said fluid source is upstream of said additive injection system, and wherein said fluid supply line comprises a pump for regulating the flow of fluid from said fluid source which is located downstream of said fluid source, wherein said additive injection system comprises
      i) an injection manifold having a plurality of injection ports, each comprised of a conduit which connects one of a plurality of supply tanks in fluid communication with said fluid supply line, wherein each supply tank contains a distinct additive substance, and
      ii) a metering mechanism positioned on each conduit which selectively actuates to open or close the conduit; and
      iii) a flow sensor attached to said fluid supply line and positioned downstream of said manifold, which senses the flow of the resulting combined fluid and additive prior to entering the extruder device;
   (b) selectively actuating in unison a first and second metering mechanisms to simultaneously open a first and second conduits thereby dispensing a first quantity of a first colored additive substance and a second quantity of a second colored additive substance into said fluid stream for a first period of time;
   (c) admixing the first quantity of the first colored additive substance and the second quantity of the second colored additive substance in said fluid stream to form a first colored solution in said fluid stream.

* * * * *